United States Patent [19]
Sato

[11] Patent Number: 5,857,631
[45] Date of Patent: Jan. 12, 1999

[54] SPINNING REEL WITH BUSHING INCLUDING TILTABLE FLANGE

[75] Inventor: Jun Sato, Sakai, Japan

[73] Assignee: Shimano, Inc., Japan

[21] Appl. No.: 661,141

[22] Filed: Jun. 10, 1996

[30] Foreign Application Priority Data

Jun. 13, 1995 [JP] Japan .................................. 7-146062

[51] Int. Cl.$^6$ .................................................. A01K 89/02
[52] U.S. Cl. ........................................................ 242/245
[58] Field of Search ................................... 242/245, 244, 242/246

[56] References Cited

U.S. PATENT DOCUMENTS

| | | | |
|---|---|---|---|
| 2,548,073 | 4/1951 | Siegrist . | |
| 4,402,469 | 9/1983 | Stiner . | |
| 4,634,073 | 1/1987 | Coquelet | 242/245 |
| 4,725,012 | 2/1988 | Councilman | 242/245 |
| 5,195,698 | 3/1993 | Kyoichi | 242/245 |
| 5,201,477 | 4/1993 | Kawabe | 242/245 |
| 5,249,760 | 10/1993 | Morimoto | 242/279 |

FOREIGN PATENT DOCUMENTS

| | | |
|---|---|---|
| 0 711 500 A1 | 5/1996 | European Pat. Off. . |
| 606030 | 8/1948 | United Kingdom . |

Primary Examiner—Donald P. Walsh
Assistant Examiner—Emmanuel M. Marcelo
Attorney, Agent, or Firm—Jeffer, Mangels, Butler & Marmaro LLP

[57] ABSTRACT

A spinning reel includes a reel body having a rear section; a rotor; a spool; a spool shaft; a bushing; and rotation control element for controlling the relative rotation between the reel body and the bushing. The spool has an axis of rotation. The spool shaft has a front end fixed to the spool and a rear end that extends into the rear section of the reel body, the rear end having a peripheral surface. The bushing includes a cylindrical member which has a peripheral surface, and which has defined therein an opening. The opening has a configuration that conforms to the peripheral surface of the rear end of the spool shaft, and supports the spool shaft such that rotation of the spool shaft relative to the cylindrical member is prevented, and such that the cylindrical member is capable of rotation relative to the reel body as well as motion in the direction of the axis of rotation. The bushing also includes a flange which is located rotatably at the peripheral surface of the cylindrical member, and connection element for linking the cylindrical member and the flange such that relative rotation between the cylindrical member and the flange is prevented while tilting of the flange relative to the cylindrical member in the direction of the axis of rotation is permitted.

20 Claims, 8 Drawing Sheets

SPINNING REEL WITH BUSHING INCLUDING TILTABLE FLANGE

FIELD OF THE INVENTION

The present invention a spinning reel, specifically, a spinning reel provided with a bushing which supports the spool shaft such that it is incapable of relative rotation, but can slide in the axial direction.

BACKGROUND OF THE INVENTION

A spinning reel, in general, is provided with a reel body, a rotor which is rotatably supported on the reel body, and a spool on which the fishing line is wound. Furthermore, the spinning reel is provided with a drag mechanism whereby the spool is stationary and does not rotate with respect to the reel body, but allows the spool to rotate when force in excess of a specified level is applied. In a rear drag type of spinning reel wherein the drag mechanism is provided at the back end of the reel body, the spool shaft, which is fixed to the spool, extends towards the rear into the drag mechanism. The drag mechanism is provided with a bushing which supports the spool shaft such that it cannot rotate relative to the reel body, but can move in the axial direction.

The use of a split-type of bushing is known in these drag mechanisms. Such bushings are composed of a flange which is a disk plate that can frictionally engage the reel body, and a cylindrical member whose shape is virtually cylindrical and that supports the spool shaft so that it cannot undergo relative rotation but can slide in the axial direction. A through-hole having an oval cross section is formed through the center of this cylindrical member to slidably support the spool shaft so that it does not rotate relative to the reel. In addition, the cylindrical member is provided on its peripheral surface with a chamfered section parallel in the direction of its axis, and thus the peripheral surface of the cylindrical member has an oval shape. An engagement hole of an oval shape is formed in the center of the flange member so that it can be fitted around the peripheral surface of the cylindrical member.

In spinning reels, generally, feel is impaired during operation of the handle and such if the spool shaft should wobble in the direction of rotation with respect to the bushing. For this reason, in the aforementioned split-type bushing, the gap between the engagement hole in the flange and the peripheral surface of the cylindrical member must be kept to a minimum. However, if the space between the flange member and the cylindrical member is made small, depending on how the bushing is attached, the flange may be pushed in at an angle so that the cylindrical member gouges the spool shaft. When this occurs, the spool shaft cannot slide smoothly. In order to prevent this situation, either a space be formed between the cylindrical member and the spool shaft so that the cylindrical member can push against the spool shaft, or a space can be formed between the cylindrical member and the flange member to allow the flange to tilt. However, if this kind of space were to be formed, wobbling would be generated in the direction of rotation, as was stated previously.

Bushings in which the cylindrical member and the flange member are a single piece are also known. However, in this single-piece type of bushing, as well, if the flange member is pushed at an angle, it grinds against the cylindrical member, and thus it is necessary to leave a certain amount of space between the cylindrical member and the spool shaft. For this reason, even in a single-piece type of bushing, wobbling is generated in the direction of rotation when a smooth sliding action of the spool shaft is attempted.

An object of the present invention is to obtain a smooth sliding action of the spool shaft as well as to reduce wobbling in the direction of rotation.

SUMMARY OF THE PREFERRED EMBODIMENTS

In accordance with one aspect of the present invention, a spinning reel for mounting onto a fishing rod is provided with a reel body, a rotor, a spool, a spool shaft, a bushing, and rotation control means. The reel body is provided with a handle and is mountable onto a fishing rod. The rotor is supported by the reel body and is rotated by means of the handle. The spool is located forward of the rotor, is rotatably supported with respect to the reel body and slidably supported along the rotor's axis of rotation. The front end of the spool shaft is fixed to the spool, and the rear end extends into the back end of the reel body. The bushing is provided with a cylindrical member, a flange, and connection means. The cylindrical member is located on the peripheral surface of the back end of the spool shaft such that it can move with respect to the reel body and supports the spool shaft such that it cannot rotate but can slide in the axial direction. The bushing is rotatably supported on the peripheral surface of the flange. The connecting means connects the cylindrical member and flange such that relative rotation between the cylindrical member and the flange is prevented, but relative tilting between the cylindrical member and the flange in the axial direction is permitted. The rotation control means controls the relative rotation between the bushing and the reel body by means of pressing the cylindrical member towards the reel body.

In this embodiment, the connection means between the cylindrical member and the flange in the bushing connects these two parts such that relative rotation is prevented while tilting in the axial direction is accommodated, so that the spool shaft is slidably supported and does not rotate relative to the cylindrical member. In this situation, should the flange be pushed in at an angle by the rotation control means, only the flange will tilt and the cylindrical member will not grind against the spool shaft, since the connection means accommodates the relative tilting of the flange and cylindrical member. Thus, the spool shaft is supported by the cylindrical member such that the spool shaft can always slide smoothly. Furthermore, wobbling in the direction of the spool shaft rotation can be reduced since the connection means prevents relative rotation of the cylindrical member and the flange, making such relative rotational more unlikely.

According to a preferred embodiment, the connection means is composed of a plurality of protuberances and a corresponding plurality of grooves into which each protuberance fits. Preferably, the protuberances are provided on a peripheral surface of the cylindrical member, and the grooves are defined in the flange. This results in a simple structure for preventing relative rotation by the cylindrical member and the flange as well as accommodating relative tilting by these two parts in the axial direction.

According to another preferred embodiment, the protuberances are columnar-shaped protuberances provided on the peripheral surface of the cylindrical member, which results in continual linear contact between the protuberances and the grooves, thus preventing relative rotation by the cylindrical member and the flange as well as accommodating relative tilting by these two parts in the axial direction in a simpler design.

In yet another preferred embodiment, the protuberances are formed as an integral piece with the cylindrical member and have a columnar shape. This makes the protuberances easy to form.

In accordance with another aspect of the invention, there is provided a spinning reel comprising a reel body having a rear section, a rotor, a spool having an axis of rotation, a spool shaft having a front end fixed to the spool and a rear end that extends into the rear section of the reel body, the rear end having a peripheral surface, a bushing, and rotation control means. The bushing includes a cylindrical member, a flange, and connection means. The cylindrical member has a peripheral surface, and that has defined therein an opening having a configuration which conforms to the peripheral surface of the rear end of the spool shaft. The cylindrical member supports the spool shaft such that rotation of the spool shaft relative to the cylindrical member is prevented and such that the cylindrical member is capable of rotation relative to the reel body as well as motion in the direction of the axis of rotation. The flange is located rotatably at the peripheral surface of the cylindrical member. The connection means links the cylindrical member and the flange such that relative rotation between the cylindrical member and the flange is prevented while tilting of the flange relative to the cylindrical member in the direction of the axis of rotation is permitted. The rotation control means controls the relative rotation between the reel body and the bushing.

Other objects, features and advantages of the present invention will become apparent to those skilled in the art from the following detailed description. It is to be understood, however, that the detailed description and specific examples, while indicating preferred embodiments of the present invention, are given by way of illustration and not limitation. Many changes and modifications within the scope of the present invention may be made without departing from the spirit thereof, and the invention includes all such modifications.

BRIEF DESCRIPTION OF THE DRAWINGS

The invention may be more readily understood by referring to the accompanying drawings in which.

DETAILED DESCRIPTION OF THE PREFERRED EMBODIMENTS

Figure 1:
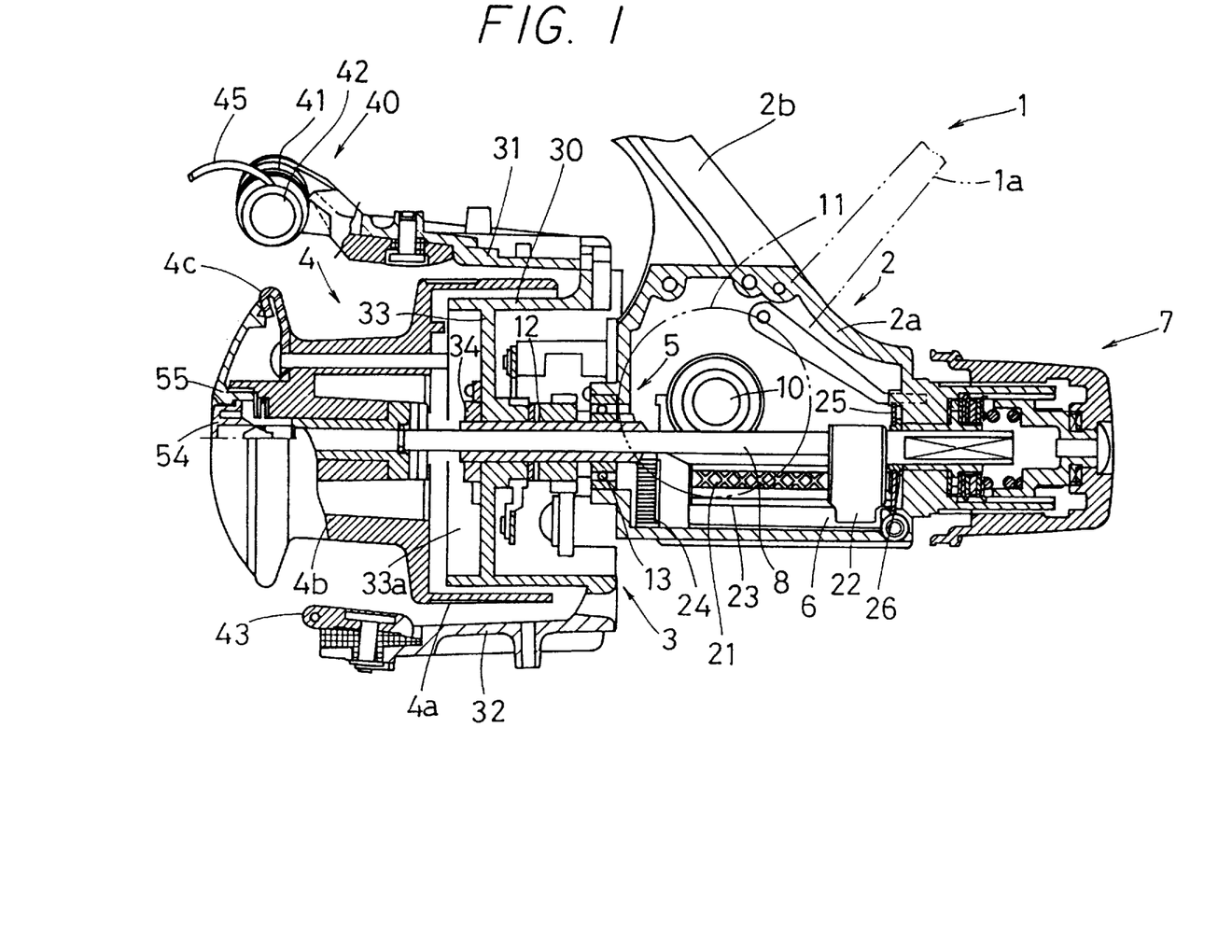
FIG. 1 is a vertical cross section schematic of a preferred embodiment of the present invention.

A first preferred embodiment of a spinning reel of this invention is illustrated in FIG. 1. Spinning reel 1 comprises a reel body 2 having a handle 1 a; a rotor 3 rotatably supported on and located forward of the reel body 2; and a spool 4, which has an axis of rotation X and which is located forward of rotor 3, for recovering a fishing line.

The reel body 2 is equipped with a body portion 2a and a mounting member 2b is formed on the upper part of the body portion 2a for attaching the spinning reel to the fishing rod. The body portion 2a houses a rotor-drive mechanism 5 for rotating rotor 3, and a level wind-drive mechanism 6 for uniformly winding the fishing line onto spool 4 by means of moving the spool 4 forward and back along its axis of rotation. In addition, the back end of the body portion 2a of the reel body 2 is formed as a cylindrical projection 2c that houses a rear drag mechanism 7. A spool shaft 8 is fixed in the spool 4 and extends towards the rear, passing through the rotor 3 and the body portion 2a, and its rear end is engaged by the rear drag mechanism 7 (described below).

The rotor-drive mechanism 5 is provided with a master gear 11 that rotates in tandem with a shaft 10 to which a handle 1a is affixed and a pinion gear 12 that engages this master gear 11 (tooth section not shown). The pinion gear 12 is formed as a cylinder with its front end passing through the center of the rotor 3 and extending towards the spool 4. The pinion gear 12 is rotatably supported by means of ball bearings 13 which are supported by the body portion 2a. Furthermore, a spool shaft 8 passes through the center of the pinion gear 12 so that the spool shaft can move forward and back along the center of rotation. A specified space is maintained between the inside diameter of the pinion gear 12 and the outside diameter of the spool shaft 8.

Figure 2:
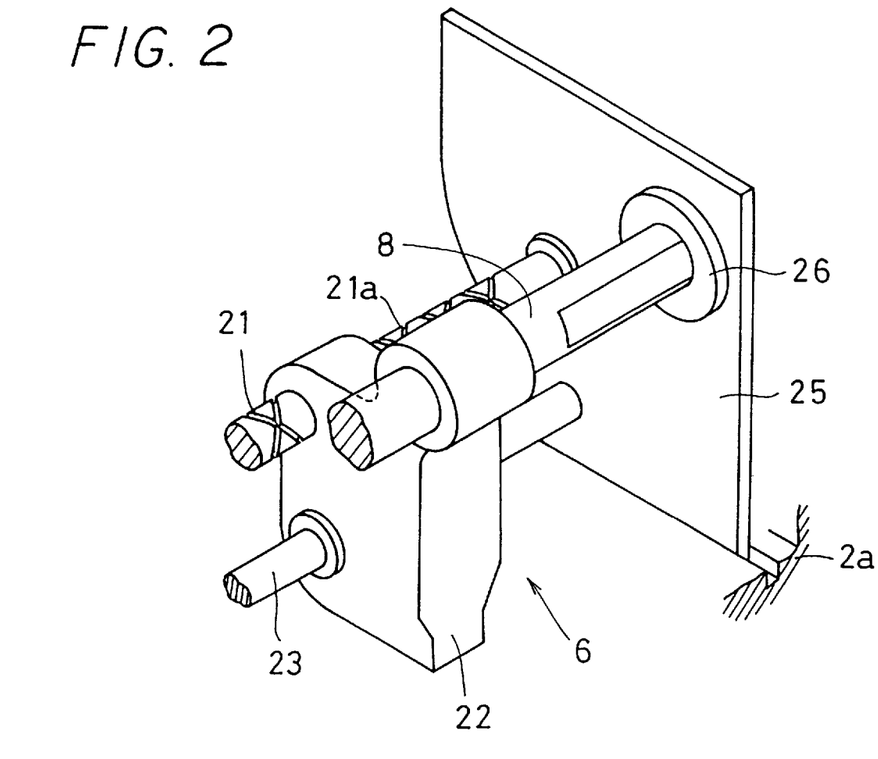
FIG. 2 is a partial oblique view of the level wind component.

A level wind-drive mechanism 6 is a component for transforming the rotation of a shaft 10 into forward and back motion by the spool shaft 8. As shown in FIGS. 1 and 2, the level wind-drive mechanism 6 is equipped with a threaded shaft 21 located below the spool shaft 8; a slider 22 that moves forward and back along the threaded shaft 21; a guide shaft 23 located below the threaded shaft 21; and an intermediate gear 24 (FIG. 1) that engages the pinion gear 12 and that is fixed to the front end of the threaded shaft 21. The threaded shaft 21 and the guide shaft 23 lie parallel to the spool shaft 8. On the peripheral surface 21b of the threaded shaft 21 is a spiral groove 21a, and an engagement component (not illustrated) is provided in the interior of the slider 22 for engaging the groove 21a.

A fixing plate 25 having a face perpendicular to the axial direction of the spool shaft 8 is inserted in the body portion 2a with a certain amount of play. In the area where the spool shaft 8 passes through the fixing plate 25, a bearing 26 is provided for rotatably supporting the spool shaft 8. The fixing plate 25 rotatably supports the rear end of the threaded shaft 21 and maintains the rear end of the guide shaft 23 in a fixed manner. The front end of the threaded shaft 21 is rotatably supported by the body portion 2a and the front end of the guide shaft 23 is fixed to the body portion 2a.

In this manner, by employing the fixing plate 25, which is loosely inserted into the body portion 2a, to support the threaded shaft 21 and the guide shaft 23, the gap between the spool shaft 8, the threaded shaft 21, and the guide shaft 23 is held constant. Even if the body 2 is bent the slider 22 can be moved smoothly.

The rotor 3 is provided with a sleeve-shaped member 30, and a first arm member 31 and a second arm member 32 which face each other on either side of this sleeve-shaped member 30. The arm members 31 and 32, and the sleeve-shaped member 30 preferably are formed as an integral piece. A front wall 33 is formed at the front end of the sleeve-shaped member 30 and a boss 33a is formed in the center of this front wall 33. A through-hole 33b is formed in the center of the boss 33a, and the front end of the pinion gear 12 and the spool shaft 8 pass through the through-hole. In addition, a thread 12a is formed at the tip of the pinion gear 12 that passes through the front wall 33, and a nut 34 is screwed onto this thread. Furthermore, the pinion gear 12 and the rotor 3 are fixed so that they do not rotate relative to each other.

A first bail support component 40 is oscillatingly attached to the inward facing side of the first arm 31 at its tip 31a (towards the front), and a second bail support component 43 is oscillatingly attached to the inward facing side of the second arm 32 at its tip 32b. The tip 40a of the first bail support component 40 is equipped with a line roller 41 that guides the fishing line onto the spool 4, and a fixed shaft cover 42 for this line roller. A bowed U-shaped bail 45 extends from the fixed shaft cover 42 towards the second bail support component 43. Bail 45 can assume line-releasing and line-retrieving positions as is known.

The spool 4 is located between the first arm 31 and the second arm 32 of the rotor 3. This spool 4 is equipped at its rear end with a ring-shaped skirt member 4a, a line winding body 4b located forward of the skirt member 4a, and a flange member 4c which is fixed to the tip of the line winding body 4b by screws 4d. The peripheral edge of the flange member 4c is bent towards the inward facing side. The sleeve-shaped member 30 of the rotor 3 is located in the interior of the skirt member 4a.

Figure 3:
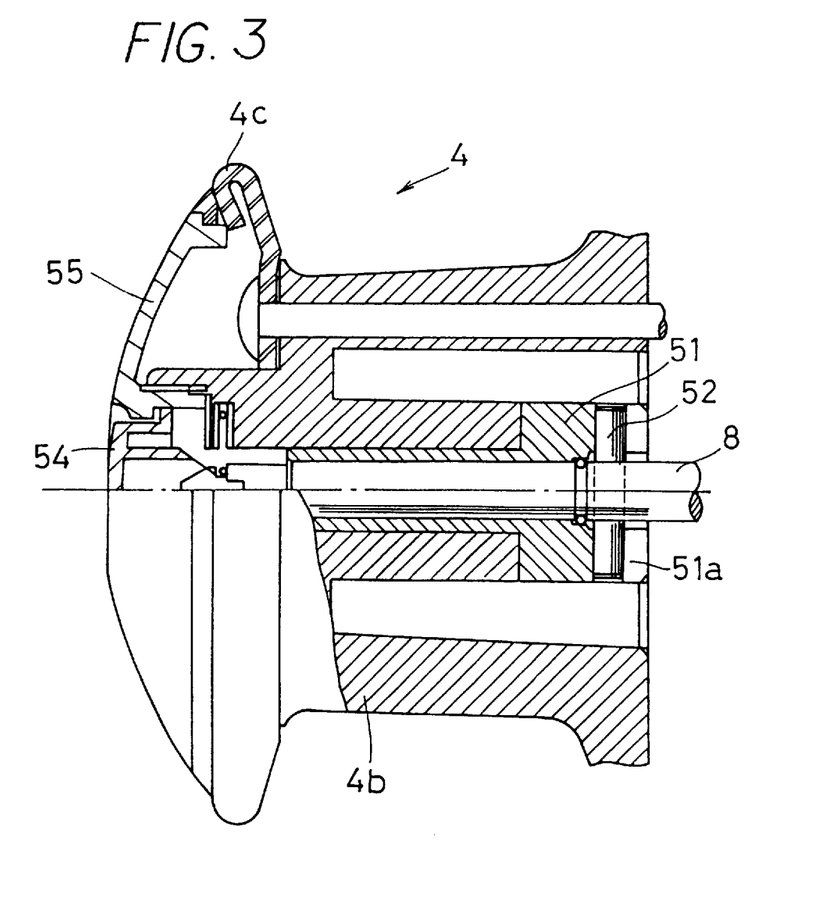
FIG. 3 is a partial cross section of the spool.

As shown in FIG. 3, a fixed bushing 51, preferably made of brass, is fitted into and attached at the center of the line winding body 4b. The leading end of the spool shaft 8 is inserted into the fixed bushing 51. The rear end of the fixed bushing 51 has an outside diameter that is larger than its other sections, and a long groove 51a is formed on this end surface in a radial direction. A pin 52 is attached to the spool shaft 8 for fixing the spool 4 and the spool shaft 8. Pin 52 engages the groove 51a to fix the spool 4 and the spool shaft 8. Pin 52 passes through the spool shaft 8 in the direction of its diameter.

When a spool made of resin is utilized, normally the inside diameter of the spool contracts when the fishing line is wound onto the spool. Therefore, to take this into account, it is necessary to provide extra space between the inside diameter of the spool 4 and the outside diameter of the spool shaft 8. Wobbling increases as a result of this space between the spool and the spool shaft. However, by fitting a fixed bushing 51, preferably made of brass, into the spool 4, the inside diameter of the spool does not contract even when taking up the line, thus eliminating the need for extra space between the inside diameter of the spool 4 and the outside diameter of the spool shaft 8. As a result, wobbling between the spool 4 and the spool shaft 8 is prevented.

The leading end of the spool shaft 8 extends beyond the line winding body 4b. A one-touch button 54 is attached to the front end of this spool shaft 8. A one-touch button collar 55 is located around the one-touch button 54. The one-touch button collar 55 screws onto the line winding body 4b of the spool 4 and keeps the one-touch button 54 in place.

Figure 4:
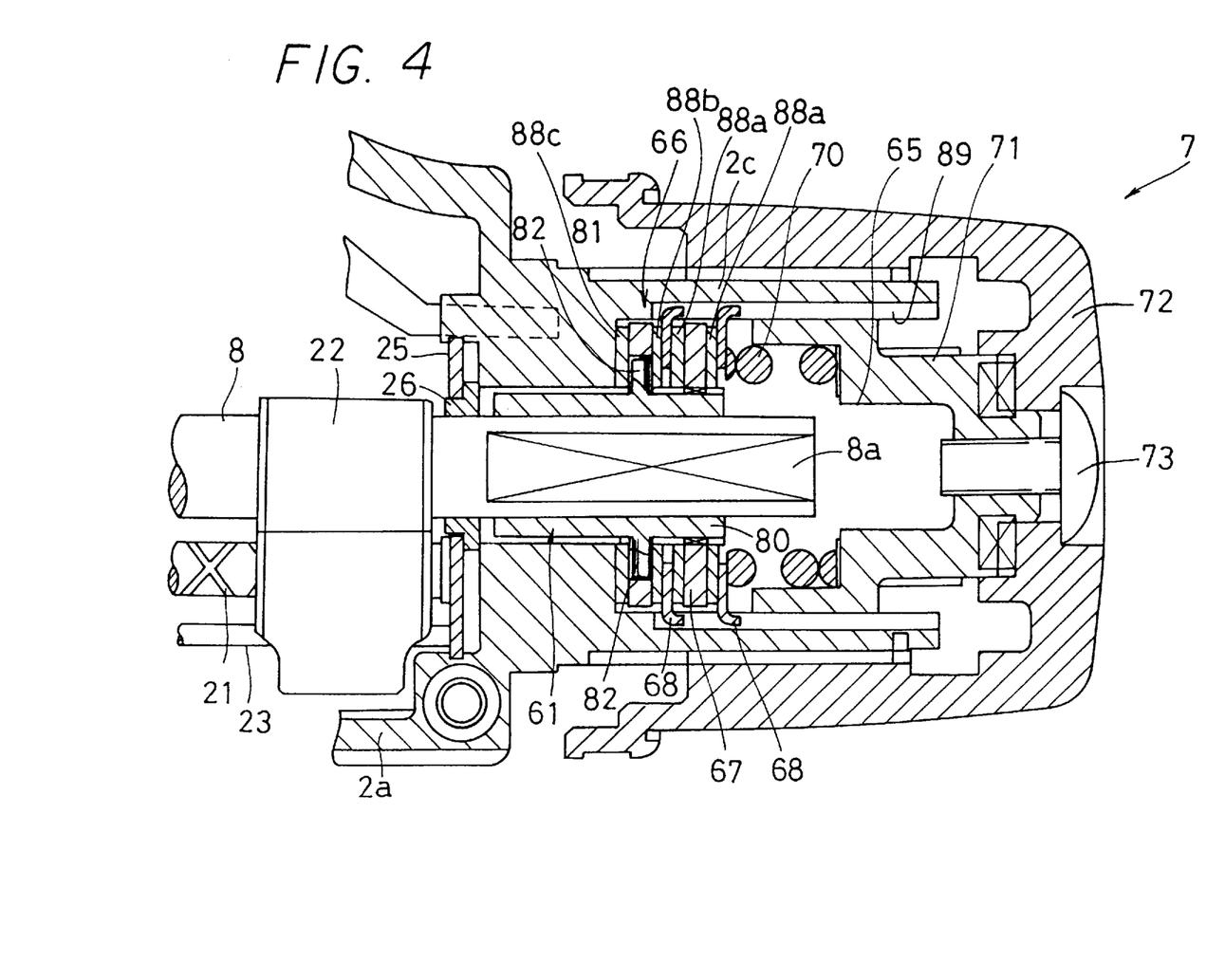
FIG. 4 is a vertical cross section of the rear drag mechanism.
Figure 5:
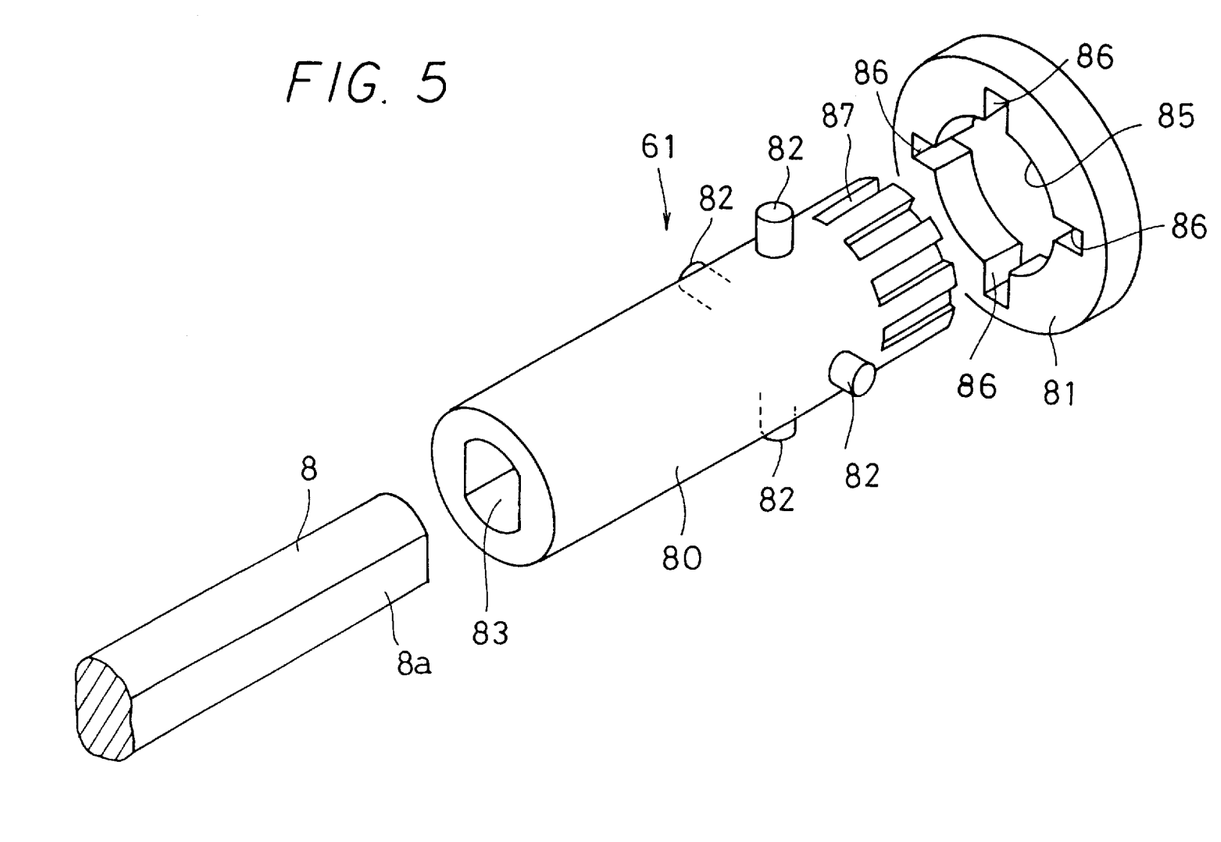
FIG. 5 is an exploded oblique view of the bushing.

As shown in detail in FIGS. 4 and 5, the rear drag mechanism 7 comprises a bushing 61 of disk shape; a friction-contact member 66 composed of a first friction plate 67 and two second friction plates 68; a coil spring 70 for exerting friction; a support member 71; and a fixed cap 72.

The bushing 61 fits around, that is, conforms to, the peripheral surface 8b of the back end of the spool shaft 8, and is not normally supported by a cylindrical projection 2c, but comes into contact with and is supported by the cylindrical projection 2c only when a load is applied. As FIG. 5 clearly shows, the bushing 61 is equipped with a columnar cylindrical member 80 and a flange 81 which is located on the peripheral surface 80a of the cylindrical member 80 and is oriented normal to the cylindrical member 80.

Four columnar protuberances 82 are provided on the peripheral surface 80a of the cylindrical member 80 in a radial direction, preferably in the shape of a cross (i.e., in two mutually perpendicular pairs). More or fewer than four protuberances 82 can be used if desired (for example, two protuberances forming an opposed pair), although use of a single protuberance may permit relative movement along the direction in which the single protuberance extends. Likewise, the protuberances 82 can have shapes other than columnar or cylindrical if desired, and can be arranged in a configuration other than a cross shape. The protuberances 82 can be affixed to the peripheral surface 80a of the cylindrical member 80, or can be formed as one piece with the cylindrical member 80, i.e., the protuberances 82 can be unitary with the cylindrical member 80.

Parallel chamfered surfaces 8a are formed at the rear end of the spool shaft 8, and the cross-sectional shape of the chamfered section 8a is approximately oval-like. An engagement hole 83, which fits around this approximately oval-like exterior surface, is defined in and passes through the center of the cylindrical member 80. By means of this structure, the spool shaft 8 is supported by the cylindrical member 80 to be slidable as well as nonrotating. That is, the spool shaft 8 is capable of motion in the direction of the spool axis, but is incapable of rotation relative to the cylindrical member 80.

The surface of the rear end of the spool shaft 8 can have a defined shape other than the exemplary embodiment described above, as long as the shape of the engagement hole 83 conforms to the defined shape of the rear end of the spool shaft 8 so that rotation of the spool shaft 8 relative to the cylindrical member 80 is substantially prevented. For example, the rear end of the spool shaft 8 can have a plurality of notches defined therein, and engagement hole 83 can have a corresponding plurality of splines which engage such notches. Other engagement mechanisms can also be used, such as those disclosed in co-pending and commonly-assigned application Ser. No. 08/553,845, to Hitomi, which is incorporated herein by reference.

Figure 6:
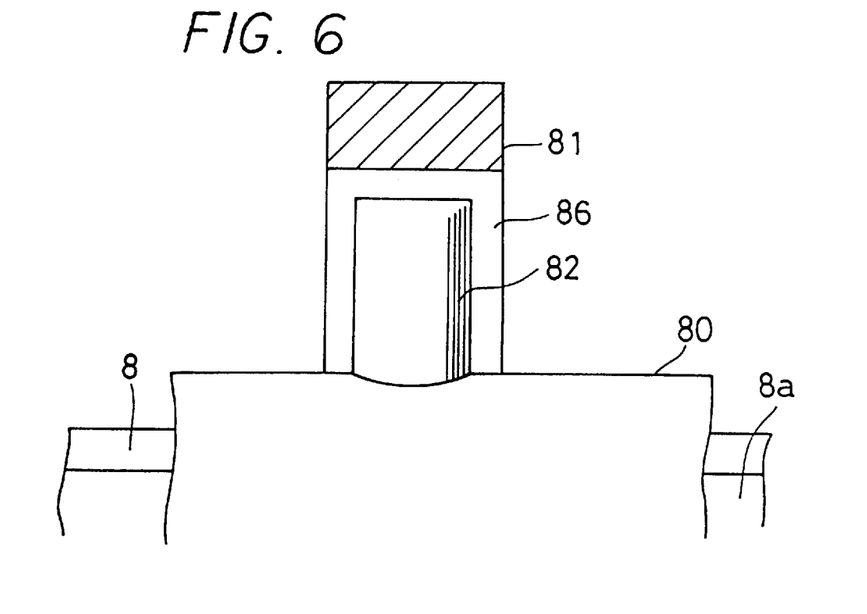
FIG. 6 is an enlarged cross section of the flange member.

As shown in FIG. 6, flange 81 is a washer-shaped ring component and its thickness is greater than the diameter of protuberance 82. As shown in FIG. 5, a center hole 85 that fits around the outer surface of the cylindrical member 80 is formed in the center of the flange 81. Grooves 86 are formed in radial directions in this center hole 85 such that each fits over one of the protuberances 82. The gaps between these grooves 86 and the protuberances 82 in the direction of the circumference are extremely small, so that wobbling in the circumferential direction (rotational direction) is reduced as much as possible. That is, aberration in rotation, or relative rotation, between the cylindrical member 80 and the flange 81 is substantially prevented. As shown in FIG. 6, the gaps between the grooves 86 and the tip of the protuberances 82 in the radial direction are made relatively large so that the flange 81 can tilt in the direction of the axis of rotation. In this situation, the grooves 86 and the protuberances 82, which protrude in a cross-like configuration, are in linear contact, and gaps are provided in the radial direction, so even if the manner in which the bushing 61 is attached causes the flange 81 to be pushed on at an angle, the flange 81 can tilt accordingly. Thus, relative rotation between the cylindrical member 80 and the flange 81 is substantially prevented, while a desired amount of tilting of the flange 81 relative to the cylindrical member 80 is allowed by means of the fit between these protuberances 82 and the grooves 86.

Figure 7:
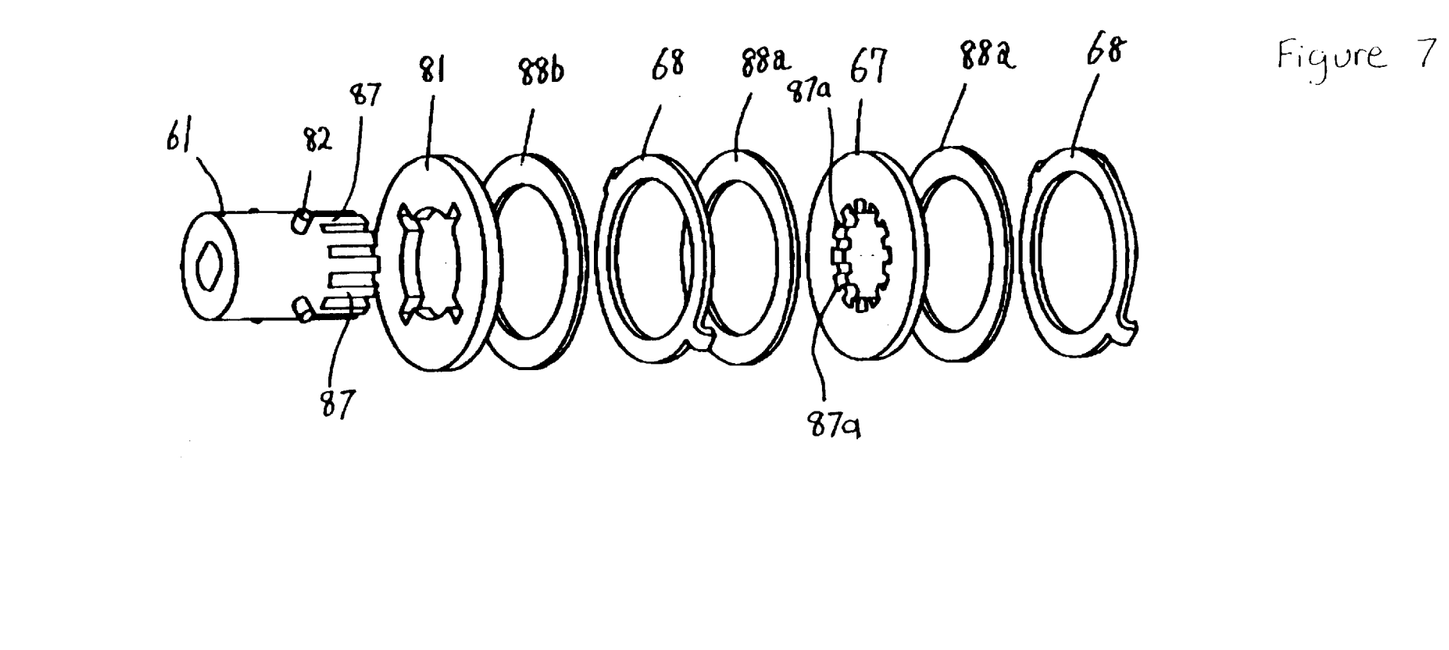
FIG. 7 is an exploded oblique view showing the orientation of the cylindrical member, flange and friction plates in an embodiment of the invention.

A plurality of splines 87 is formed on the rear peripheral surface 61a of the bushing 61 and a corresponding plurality of spline grooves 87a is formed on the inner peripheral surface of the first friction plate 67. Friction plate 67 fits over the splines 87 as shown in FIG. 7. The first friction plate 67 and the two second friction plates 68 are arranged in alternating fashion. The outer edges of the second friction plates 68 fit into spline grooves 89 which are formed along the inside of the cylindrical projection 2c. Rotatably supported friction facings 88a, 88b, and 88c are respectively located between the first friction plate 67 and the second friction plate 68, the second friction plate 68 and the flange 81, and the flange 81 and the front wall of the cylindrical projection 2c. The coil spring 70 supported by the cylinder-shaped support component 71 presses the first friction plate 67 and the second friction plates 68 together. This results in control of the relative rotation by means of the frictional contact between the bushing 61 and the reel body 2.

A fixing cap 72 is screwed from the outside onto screw thread 2d formed on the peripheral surface 2e of the cylindrical projection 2c. Fixing cap 72 is fixed to the support component 71 by means of a bolt 73, and holds the support component 71 in a specified position. By means of adjusting the screw tightness of the fixed cap 72, the push force against each of the plates composing the friction contact member 66 can be changed and drag force can be adjusted.

A description of the foregoing preferred embodiment in operation is given below, focusing primarily on the operation of line recovery.

At the time of line recovery, bail 45 is switched to its line-retrieving position. When the handle 1a is rotated with the bail in this position, rotational force is transferred via the shaft 10 and the master gear 11 to the pinion gear 12. The torque which is transferred to this pinion gear 12 is transferred via the front part of the pinion gear 12 to the rotor 3. In the meanwhile, the torque of the shaft 10 is transformed into a forward and back motion with respect to the spool shaft 8 by means of the level wind component 6. Specifically, the spool 4 experiences reciprocal motion. As a result, the line which is guided by the bail 45 and a line roller 41 is evenly wound in the forward and back direction onto the line winding body 4b.

Due to the fixed bushing 51 which has been inserted into the center of the spool 4, even if a lot of line is wound onto the spool 4 at this time, the inside diameter of the spool 4 does not contract. In addition, the guide shaft 23 and screw shaft 21 of the level wind component 6 are supported by the fixing plate 25, which is provided separately from the body portion 2a. The spool shaft 8 is also supported by this fixing plate 25 via the bearing 26, which averts any effect on the movement of slider 22 even if the body portion 2a should bend due to a large load, thus allowing the slider 22 to travel smoothly.

The operation of the rear drag mechanism 7 will be explained next.

When, for example, a fish pulls the line with great force when the line is being wound by the handle 1a, the spool 4 attempts to rotate in the direction of line release. This force is transferred to the bushing 61 via the spool shaft 8. Subsequently, if this force exceeds the frictional force of the friction-contact component 66, the spool 4 rotates.

Here, it is necessary to ensure a specified gap between the spool shaft 8 and the bushing 61 in the direction of the diameter in order to allow these two parts to slide relative to each other. In addition, depending on the condition in which the bushing 61 was attached, the flange 81 might tilt and be pushed against by the friction-contact component 66. In the past, when the flange tilts and is pushed in this manner, the gap between the spool shaft 8 and the bushing 61 had to be increased because the bushing would grind and the two parts would not slide smoothly. However, if the amount of space is increased, wobbling in the direction of rotation increases, and there is less feeling during handle operation. In this preferred embodiment, however, the cylindrical component 80 of the bushing 61 and the flange 81 are connected by means of engaged protuberances 82 and grooves 86, thus preventing relative rotation between these parts as well as allowing for relative tilt of these parts in the direction of rotation. Therefore, even if the flange 81 tilts and is pushed against, the flange 81 tilts so that this force is absorbed and the cylindrical member 80 does not grind. As a result, the amount of space necessary between the spool shaft 8 and the cylindrical component 80 for a smooth sliding action can be minimized and wobbling in the direction of rotation is also reduced.

Figure 8:
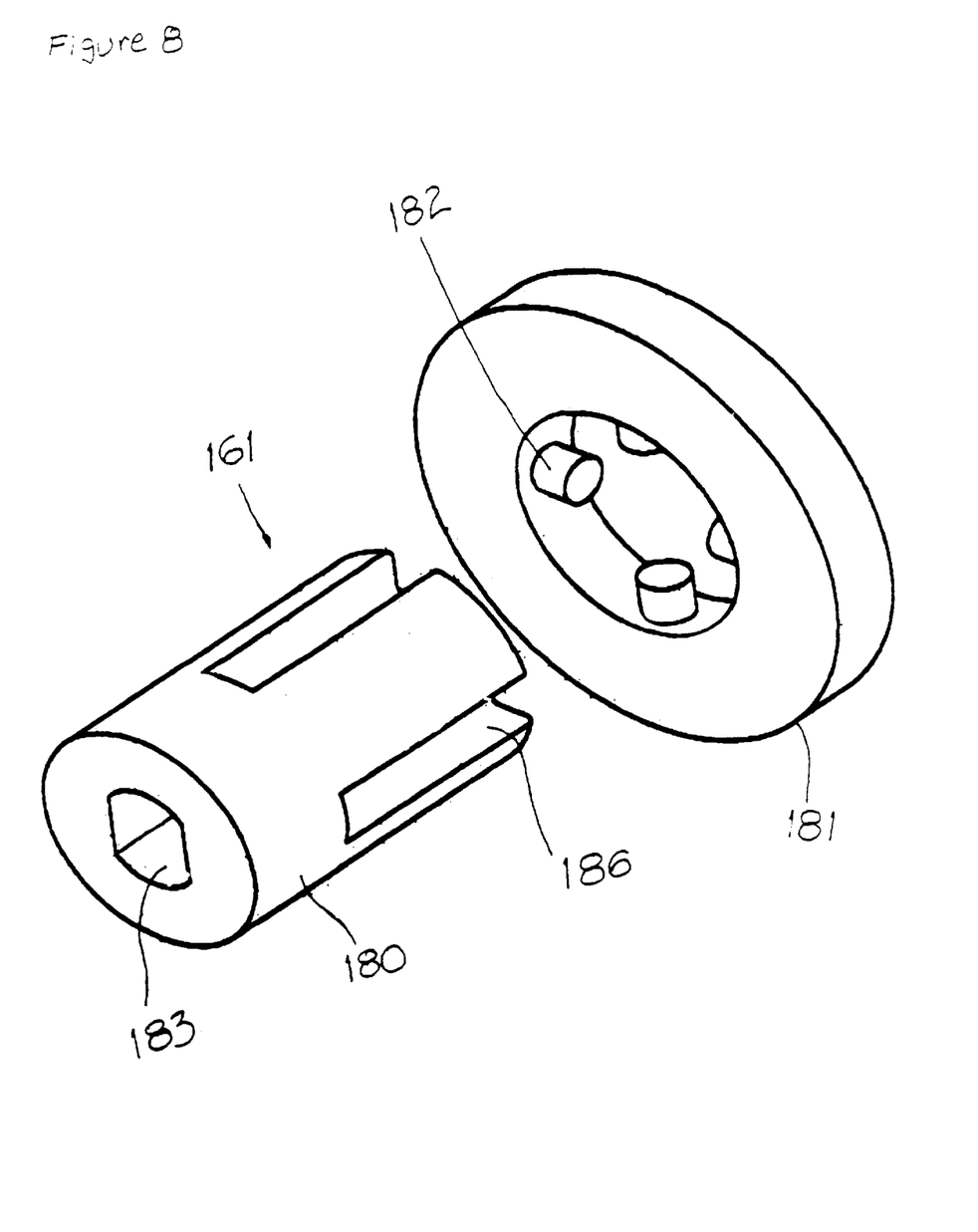
FIG. 8 is a perspective view of an alternative embodiment of the cylindrical member and flange of the invention.

The connection means between the cylindrical member 80 and the flange 81 is not limited to engaged protuberances 82 and grooves 86, but can be any kind of means insofar as it allows the relative tilt of these two parts as well as prevents relative rotation as described herein. For example, in the alternative embodiment of FIG. 8, bushing 161 includes a cylindrical member 180 and a flange 181. Cylindrical member 180 has defined therein an engagement hole 183 for engaging the rear end of the spool shaft 8, and further comprises a plurality of grooves 186. Flange 181 fits around cylindrical member 180 and comprises a corresponding plurality of columnar protuberances 182 which engage the grooves 186.

What is claimed is:

1. A spinning reel for mounting on a fishing rod, said spinning reel comprising:
    (a) a reel body that has a handle and that is mountable on a fishing rod, said reel body having a rear section;
    (b) a rotor that is supported by said reel body and rotated by said handle;
    (c) a spool that has an axis of rotation and that is located forward of said rotor, said spool being supported on said reel body such that it is adapted to rotate relative to said reel body as well as motion in the direction of said axis of rotation;
    (d) a spool shaft having a front end fixed to said spool and a rear end that extends into said rear section of said reel body, said rear end having a peripheral surface;
    (e) a bushing that comprises
        (i) a cylindrical member which is located at said peripheral surface of said rear end of said spool shaft and which supports said spool shaft such that rotation of said spool shaft relative to said cylindrical member is prevented and such that said cylindrical member is adapted to rotate relative to said reel body as well as to move in the direction of said axis of rotation, said cylindrical member having a peripheral surface,
        (ii) a flange which is located rotatably at said peripheral surface of the cylindrical member, and
        (iii) connection means for linking said cylindrical member and said flange such that relative rotation between said cylindrical member and said flange is prevented while tilting of said flange relative to said cylindrical member in the direction of said axis of rotation is permitted; and
    (f) rotation control means for controlling the relative rotation between said reel body and said bushing by pushing said flange toward said reel body.

2. A spinning reel as defined in claim 1 wherein said connection means comprises a plurality of radially projecting protuberances provided to said cylindrical member and a plurality of grooves defined in said flange, each of said protuberances fitting into one of said grooves.

3. A spinning reel as defined in claim 2 wherein each of said protuberances is a columnar protuberance provided to a peripheral surface of said cylindrical member.

4. A spinning reel as defined in claim 3 wherein each of said protuberances is formed on said peripheral surface of said cylindrical member as one piece with said cylindrical member.

5. A spinning reel as defined in claim 3 wherein each of said columnar protuberances has a circular cross-section.

6. A spinning reel as defined in claim 2 wherein said cylindrical member comprises four protuberances and said flange has defined therein four grooves.

7. A spinning reel as defined in claim 6 wherein said four protuberances are provided on said peripheral surface of said cylindrical member in the form of a cross.

8. A spinning reel as defined in claim 1 wherein said connection means comprises a plurality of radially projecting protuberances provided to said flange and a plurality of grooves defined in a peripheral surface of said cylindrical member, each of said protuberances fitting into one of said grooves.

9. A spinning reel as defined in claim 1 wherein said rear end of said spool shaft has a peripheral surface having a defined shape and said cylindrical member has defined therein an opening having a configuration that conforms to peripheral surface such that said spool shaft is adapted to move in the direction of said axis of said spool but does not rotate relative to said cylindrical member.

10. A spinning reel as defined in claim 9 wherein said rear end of said spool shaft has a peripheral surface that includes a pair of parallel chamferred surfaces and said cylindrical member has defined therein an opening having a configuration that conforms to said peripheral surface.

11. A spinning reel comprising:
   (a) a reel body having a rear section;
   (b) a rotor;
   (c) a spool having an axis of rotation;
   (d) a spool shaft having a front end fixed to said spool and a rear end that extends into said rear section of said reel body, said rear end having a peripheral surface;
   (e) a bushing that comprises
      (i) a cylindrical member having defined therein an opening having a configuration which conforms to said peripheral surface of said rear end of said spool shaft and which supports said spool shaft such that rotation of said spool shaft relative to said cylindrical member is prevented and such that said cylindrical member is adapted to rotate relative to said reel body as well as motion in the direction of said axis of rotation, said cylindrical member having a peripheral surface,
      (ii) a flange which is located rotatably at said peripheral surface of said cylindrical member; and
      (iii) connection means for linking said cylindrical member and said flange such that relative rotation between said cylindrical member and said flange is prevented while tilting of said flange relative to said cylindrical member in the direction of said axis of rotation is permitted; and
   (f) rotation control means for controlling the relative rotation between said reel body and said bushing.

12. A spinning reel as defined in claim 11 wherein said connection means comprises at least one protuberance provided to said cylindrical member and at least one groove defined in said flange.

13. A spinning reel as defined in claim 12 wherein said at least one protuberance is affixed to said peripheral surface of said cylindrical member.

14. A spinning reel as defined in claim 11 wherein said at least one protuberance is formed as one piece with said cylindrical member.

15. A bushing for a spinning reel having a spool with an axis of rotation, a spool shaft and a reel body, said bushing comprising:
   (a) a cylindrical member having defined therein an opening having a configuration which conforms to a peripheral surface of a rear end of said spool shaft and which is adapted to support said spool shaft such that rotation of said spool shaft relative to said cylindrical member is prevented, said cylindrical member having a peripheral surface,
   (b) a flange which is located rotatably at said peripheral surface of said cylindrical member; and
   (c) connection means for linking said cylindrical member and said flange such that relative rotation between said cylindrical member and said flange is prevented while tilting of said flange relative to said cylindrical member in the direction of said axis of rotation is permitted.

16. A bushing as defined in claim 15 wherein said connection means comprises at least one protuberance provided to said cylindrical member and at least one groove defined in said flange.

17. A method of making a bushing for a spinning reel having a spool with an axis of rotation and a spool shaft, said method comprising the steps of:
   (a) forming a cylindrical member having defined therein an opening having a configuration which conforms to a peripheral surface of a rear end of said spool shaft and which is adapted to support said spool shaft such that rotation of said spool shaft relative to said cylindrical member is prevented, said cylindrical member having a peripheral surface,
   (b) forming a flange which is adapted to be located rotatably at said peripheral surface of said cylindrical member;
   (c) providing said cylindrical member and said flange with connection means for linking said cylindrical member and said flange such that relative rotation between said cylindrical member and said flange is prevented while tilting of said flange relative to said cylindrical member in the direction of said axis of rotation is permitted; and
   (d) engaging said flange with said cylindrical member.

18. A method as defined in claim 17 wherein in step (c) said connection means comprise at least one protuberance provided to said cylindrical member and at least one groove defined in said flange.

19. A method as defined in claim 18 wherein said at least one protuberance is affixed to said peripheral surface of said cylindrical member.

20. A method as defined in claim 18 wherein said at least one protuberance is formed as one piece with said cylindrical member.

* * * * *